Patented Sept. 27, 1932

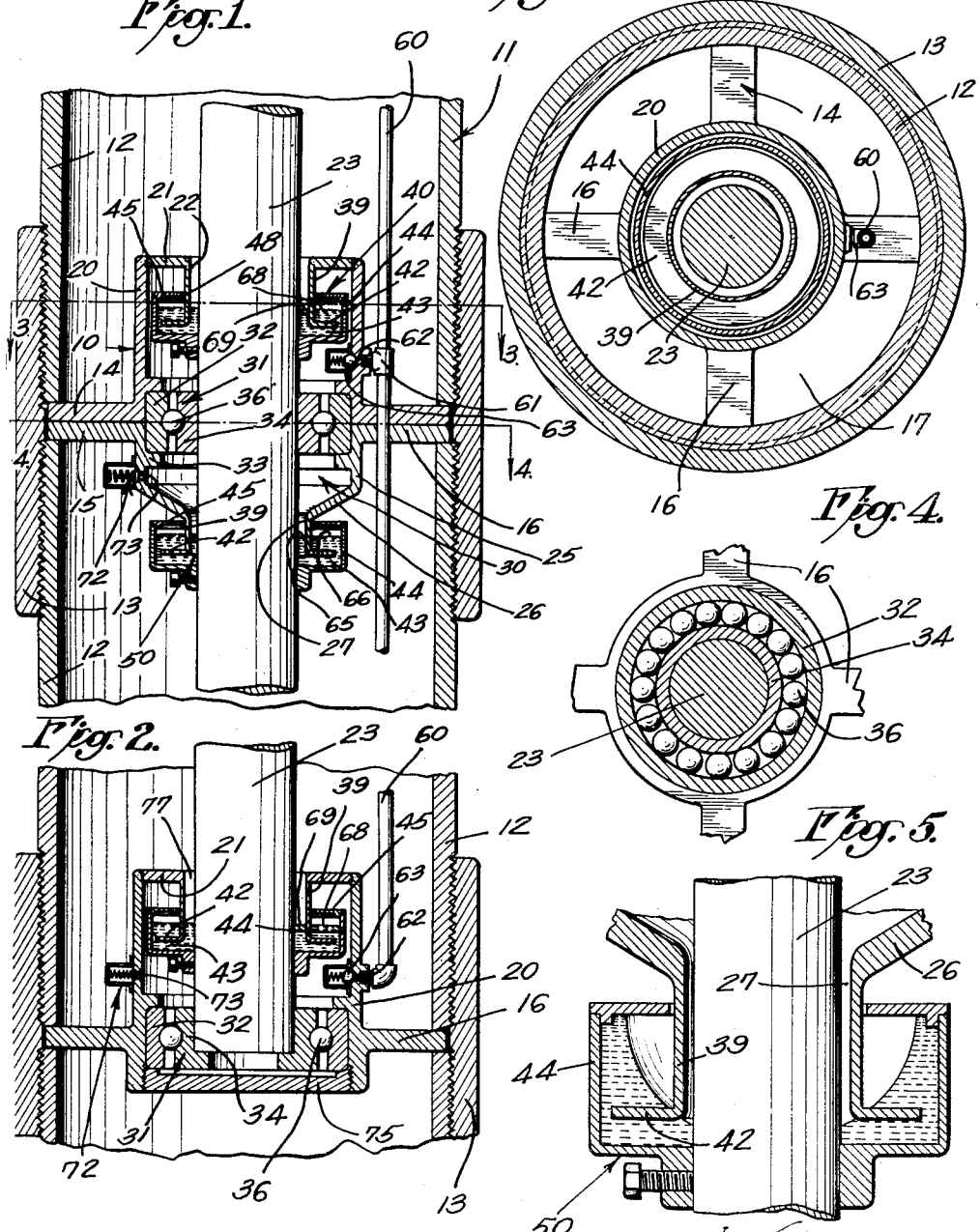

1,879,627

UNITED STATES PATENT OFFICE

EARL MENDENHALL AND JUNIUS B. VAN HORN, OF LOS ANGELES, CALIFORNIA

BEARING STRUCTURE HAVING UNBALANCED LUBRICATION

Application filed February 20, 1928. Serial No. 255,544.

Our invention relates to submersible structures, and more particularly to a bearing structure which may be submerged in a fluid which might injure the bearing surfaces thereof should it reach these surfaces.

It is often desirable to journal a vertical shaft at points below the surface of a fluid. This is especially the case in the deep-well turbine art where it is desirable to locate a turbine pump below the surface of the fluid in a well, this pump being operated by a suitable drive means at the surface of the ground. A line shaft connects the drive means to the impellers of the turbine pump, and this line shaft must be frequently journalled throughout its length. We have found it possible to form a fluid-sealed bearing structure which may be wholly or partially filled with a suitable lubricating medium which surrounds the bearing to insure correct lubrication.

It is an object of our invention to provide a bearing structure which may be submerged in any fluid, even though this fluid is of such a nature that it would be injurious to the bearing surfaces.

A further object of our invention is to provide a bearing structure containing a bearing, this bearing structure being supplied with a suitable lubricating medium from a point above the surface of the fluid in which the bearing structure is submerged.

Another object of our invention is to provide a bearing structure containing a bearing completely surrounded by a lubricating medium, this medium being separated from the fluid in which the bearing structure is submerged by means of one or more fluid-packed seals.

A further object of our invention is to provide a bearing structure filled with a lubricating medium, this medium being under a higher pressure than the fluid surrounding the bearing structure and in which this structure is submerged.

Other objects of the invention lie in the provision of an improved submersible structure in combination with a fluid-packed sealing means.

Further objects and advantages of our invention will be made evident hereinafter:

In the drawing, we have illustrated our invention with particular relation to the deep-well turbine art. The drawing serves to illustrate our bearing structure with this art, but it should be understood that we are not limited to the exact form or use shown therein.

Referring to the drawing,—

Fig. 1 is a vertical sectional view of the bearing structure of our invention.

Fig. 2 is a similar bearing structure suitable for journalling the lower end of a shaft.

Fig. 3 is a sectional view taken on the line 3—3 of Fig. 1.

Fig. 4 is a sectional view taken on the line 4—4 of Fig. 1.

Fig. 5 is an enlarged view of a fluid-packed seal of our invention when the shaft, journalled in the bearing structure, is rotating.

Referring particularly to Fig. 1, the bearing structure 10 of our invention is shown as being positioned in a discharge pipe 11 which is adapted to extend from a pump head at the surface of the ground downward to a turbine pump located below the surface of the fluid in the well. The discharge pipe 11 is made up of sections 12 joined by suitable coupling members 13. In Fig. 1, arms 14 and 15 of the bearing structure 10 are shown clamped between adjacent sections 12 by means of the coupling 13. The arms 14 and 15 comprise supporting webs 16 which are preferably equally spaced about the periphery of the bearing structure 10, there being openings 17 therebetween, these openings allowing the passage of well fluid upward through the discharge pipe 11. Extending upward from the arms 14 is an upper wall 20, this upper wall being closed near the top thereof by a cover 21 having an opening 22 therein, this opening being slightly larger than a shaft 23 adapted to be journalled in the bearing 10. Extending downward from the arms 15 is a lower wall 25, this wall having a conical portion 26 ending in an opening 27 which is adapted to surround the shaft 23.

The upper and lower walls 20 and 25, together with the cover 21 and the conical portion 26 define a bearing chamber 30. Mounted in this bearing chamber is a suitable bearing 31 which may be of the ball, sleeve, or roller type. As shown in the drawing, this bearing comprises an outer race 32 secured in the walls 20 and 25 as by ribs 33. An inner race 34 is adapted to engage the outer periphery of the shaft 23, the inner and outer races being separated by suitable ball bearings 36.

Extending downward from the upper wall 21 adjacent the opening 22 is an apron 39 of a fluid-packed seal 40 of our invention, this seal being adapted to close the junction between the cover 21 and the shaft 23 in fluid-tight relationship. A radial plate 42 is formed on the lower end of the apron 39, a portion or all of this plate being below the surface of a body of mercury 43 held in a cup 44 secured to the shaft 23. A cover 45 closes the upper end of the cup 44 and extends inward toward the apron 39, there being a clearance space 48 therebetween.

A similar fluid-packed seal 50 holds the lower wall 25 and the shaft 23 in fluid-tight relationship. This seal is identical in construction with the seal 40, and similar numbers appear on identical parts of these two seals. The apron 39 of the seal 50 is secured to the conical portion 26.

The bearing chamber 30 is adapted to be partially or completely filled with a lubricating medium supplied thereto by a pipe 60 extending upward to a point above the surface of the fluid in the discharge pipe 11. The pipe 60 has couplings 61 which communicate with each bearing structure 10 mounted in the discharge pipe 11. These couplings communicate with the bearing chamber 30 through openings 62. We prefer to close these openings by means of a suitable check valve 63, which may be of any desired construction, which permits the lubricating medium to enter the bearing chamber 30 from the pipe 60, but prevents any return flow thereof.

If sufficient lubricating medium is forced into the bearing chamber 30, the pressure thereon will be greater than the pressure of the fluid in the discharge pipe. In this event, a surface 65 of the mercury 43 lying in the opening 27 of the seal 50 will be lowered relative to a surface 66 of the mercury 43 surrounding the apron 39 of the seal 50. This is due to the fact that the lubricating medium in the bearing chamber 30 is in contact with the surface 65 while the well fluid is in contact with the surface 66. Similarly, a surface 68 of the mercury in the seal 40 will at this time be lowered relative to a surface 69 between the apron 39 and the shaft 23. If this pressure on the lubricating medium becomes sufficiently great, a portion of this fluid will bubble through the mercury either when the surface 65 is lowered to a point adjacent the lower edge of the radial plate 42 of the seal 50, or when the surface 68 lowers to a point adjacent the lower surface of the radial plate 42 of the seal 40. This lubricating medium will bubble through the mercury 43 and will reach the fluid in the well.

It is entirely possible to use the seal of our invention in this capacity, but we prefer to provide a pressure-relief valve 72 closing an opening 73 through the lower wall 25, this pressure-relief valve being so adjusted that it will release any excess of pressure in the bearing chamber 30 before the difference in pressure between this medium and the fluid in the well becomes great enough to displace the mercury 43 of either the seal 40 or the seal 50 to such an extent that these seals allow an escape of lubricating medium. The pressure-relief valve 72 may be of any design but should be of such a type that no well fluid will be allowed to pass into the bearing chamber 30 therethrough.

When in operation, the mercury 43 in the seals 40 and 50 is acted upon by centrifugal force to throw it into a shape substantially as shown in Fig. 5. It should be noted that the outer edge of the radial plate 42 is at all times below the surface of the mercury so that no intermixing of the lubricating medium and the well fluid takes place unless the difference in pressures thereon becomes large. It should be understood that the mercury will assume the shape shown in Fig. 5 only when the pressures on the lubricating medium and the well fluid are substantially equal. Should these pressures be different, a certain displacement in the surfaces 65 and 66 and the surfaces 68 and 69 will necessarily take place.

Lubricating medium is supplied either continuously or intermittently to the bearing chamber 30 of each bearing structure 10 through the pipe 60, any excess of pressure being relieved through the pressure-relief valve 72, if used, or through the seal 50 if the pressure-relief valve is not used. It should be understood that we are not limited to the use of a single pipe extending downward to lubricate all the bearings. It is entirely possible to use a separate pipe 60 for each bearing structure 10.

It is often desirable to journal the lower end of a shaft below the surface of the well fluid. A bearing structure capable of performing this function is shown in Fig. 2. This bearing structure is substantially identical with Fig. 1 except that the seal 50 is eliminated, the lower end of the bearing chamber being closed by a plate 75. This bearing structure is lubricated in a manner similar to that shown in Fig. 1, and may be used either with or without the pressure-relief valve 72, as previously described. If this pressure-relief valve is eliminated, any excess pressure in the bearing chamber will cause the surface 68 to lower sufficiently so that this lubricating medium will bubble through the mercury and pass upward through an opening 77 between the apron and the shaft. It should be understood that this opening 77 must be designed sufficiently large so as to hold the body of mercury 43 when the lubricating medium is bubbling therethrough, in order that this mercury will not escape.

While we have shown the bearings 31 as being rigidly secured in the bearing chambers 30, it should be understood that it is within the scope of our invention to have these bearings slidable either in the bearing chamber or relative to the shaft 23. Neither are we limited to the form of bearings shown in the drawing, inasmuch as our bearing structure is applicable to all types of bearings.

Should the pressure of the well fluid become greater than the pressure of the lubricating medium, the check valve 63 and the pressure-relief valve 72 will, of course, close and no well fluid will displace the mercury 43 sufficiently to bubble therethrough, inasmuch as the lubricating medium in the bearing chamber 30 is relatively incompressible.

We claim as our invention:

1. In a submersible bearing structure, the combination of: walls forming a bearing chamber; a shaft extending into said bearing chamber; a bearing in said bearing chamber for rotatably journalling said shaft; a pipe communicating with said bearing chamber to supply a lubricating medium thereto, said pipe extending above the fluid in which said bearing is submerged; a pressure-relief valve adapted to allow the passage therethrough of any excess of lubricating medium reaching said bearing chamber; and a fluid-packed seal closing the junction between said shaft and said walls forming said bearing chamber.

2. In a submersible structure, the combination of: walls forming a chamber; a shaft extending into said chamber; a pipe communicating with said chamber to supply a liquid medium thereto, said pipe extending above the fluid in which said structure is submerged; a check valve preventing any return flow of said liquid medium through said pipe; a pressure-relief valve adapted to allow the passage therethrough of any excess of liquid medium reaching said chamber; and a fluid-packed seal closing the junction between said shaft and said walls forming said chamber.

3. In a submersible structure, the combination of: walls forming a chamber containing a liquid medium, said walls being submerged in a fluid; a shaft extending into said chamber; means for supplying liquid medium to said chamber at a pressure greater than the pressure of said fluid; a fluid-packed seal closing the junction between said shaft and said walls; and pressure-release means for allowing an escape of said liquid medium therethrough from said chamber should the difference in pressure between said liquid medium and said fluid exceed a predetermined value which value is below the value which would cause escape through said fluid-packed seal.

4. In a submersible structure adapted to be submerged in a surrounding fluid, the combination of: walls forming a bearing chamber substantially filled with a lubricating medium; a shaft extending through said walls and into said bearing chamber; a bearing in said chamber for rotatably journalling said shaft; a body of sealing liquid in sealing relationship with said shaft and said walls, said body of sealing liquid being in pressure-transferring relationship with both said surrounding fluid and said lubricating medium and displaceable by an excess of pressure inside said walls to allow an escape of lubricating medium therethrough and into said surrounding fluid; means for supplying lubricating medium to said bearing chamber; and a pressure relief valve for allowing an escape of lubricating medium therethrough and into said surrounding fluid at a lower pressure differential than that pressure differential at which said lubricating medium would escape through said body of sealing liquid.

5. In a submersible bearing structure, the combination of: walls submerged in a surrounding fluid and defining a bearing chamber, said bearing chamber being substantially filled with a body of lubricating medium; pressure-transferring means for transferring pressure between said surrounding fluid and said lubricating medium; a pipe extending above the surface of said surrounding fluid and communicating with said bearing chamber for supplying lubricating medium thereto; and means for preventing any return flow of said lubricating medium from said bearing chamber into said pipe.

6. In a submersible structure adapted to be submerged in a surrounding fluid, the combination of: walls forming a bearing chamber substantially filled with a lubricating medium; a shaft extending through said walls and into said bearing chamber; a bearing in said chamber for rotatably journalling said shaft, there being a body of liquid in sealing relationship with said shaft and said walls, said body of liquid being displaceable to allow a pressure transfer between said lubricating medium and said surrounding fluid; supply means for supplying additional lubricating medium to said bearing chamber; and a check valve preventing any return flow of said lubricating medium into said supply means.

7. In a submersible bearing structure adapted to be submerged in a surrounding liquid, the combination of: walls forming a bearing chamber substantially filled with a lubricating medium; a shaft extending into said bearing chamber through said walls; a bearing in said chamber for journalling said shaft; cup means secured to said shaft and retaining an annular body of sealing liquid which is of greater density than either said lubricating medium or said surrounding liquid; stationary apron means secured to said walls and extending around said shaft and separating said lubricating medium and said surrounding liquid and extending into said body of sealing liquid whereby said body of sealing liquid is displaceable by an excess of pressure on said lubricating medium to allow a portion of said lubricating medium to rise therethrough around the edge of said apron and into the surrounding liquid; and a pipe means communicating with said bearing chamber to supply lubricating medium thereto at a pressure greater than the pressure of said surrounding liquid adjacent said walls.

8. In a submersible structure, the combination of: walls submerged in a surrounding fluid and defining a chamber; sealing means separating said surrounding fluid and said chamber and including a body of sealing liquid and an apron extending thereinto, one side of said apron communicating with said chamber and the other side communicating with said surrounding fluid, said apron extending into said sealing liquid whereby said sealing liquid is displaceable by a pressure differential existing between said surrounding fluid and said chamber to allow escape of fluid from said chamber into said surrounding fluid; means for increasing the pressure inside said chamber to increase the pressure differential between said chamber and said surrounding fluid; and a pressure-relief means communicating between said chamber and said surrounding fluid for releasing said pressure in said chamber before said pressure differential becomes great enough to displace said sealing liquid sufficiently to be released therethrough.

9. In a submersible structure, the combination of: walls submerged in a surrounding fluid and defining a chamber, said chamber being substantially filled with a substantially incompressible liquid medium entrapped therein; a rotatable shaft extending vertically through the upper and lower walls of said chamber; an upper seal retaining a body of sealing liquid around said shaft in sealing relationship with said shaft and said upper wall and separating said liquid medium from said surrounding fluid but being displaceable by a pressure differential between said liquid medium and said surrounding fluid; a lower seal retaining a body of sealing liquid around said shaft in sealing relationship with said shaft and said lower wall and separating said liquid medium from said surrounding fluid but being displaceable by a pressure differential between said liquid medium and said surrounding fluid, whereby changes in the pressure of said surrounding fluid are simultaneously applied to said upper and lower seals, said substantially incompressible liquid medium in said chamber preventing excessive inward displacement of said bodies of sealing liquid.

10. In a bearing structure, the combination of: walls defining a chamber; a shaft extending into said chamber; a bearing in said chamber for journaling said shaft, said chamber being substantially filled with an incompressible lubricating medium; seals at the junctions of said shaft and said walls to seal said lubricating medium in said chamber; supply means communicating with said chamber for supplying additional lubricating medium thereto; a check valve in said supply means for preventing any return flow of said lubricating medium into said said supply means; at least one of said seals comprising a pressure-transfer means for transferring pressure between said lubricating medium and the medium in which said bearing structure is submerged, said means acting to apply pressure on said lubricating medium when the pressure on said surrounding medium builds up, said check valve preventing any return flow of said lubricating medium into said supply means due to the action of said pressure-transfer means.

In testimony whereof, we have hereunto set our hands at Los Angeles, California, this 14th day of February, 1928.

EARL MENDENHALL.
JUNIUS B. VAN HORN.